(12) United States Patent
Kobayashi (10) Patent No.: US 8,346,888 B2
(45) Date of Patent: Jan. 1, 2013

(54) CONTENTS DATA OUTPUT APPARATUS, CONTENTS DATA DELIVERY SYSTEM, CONTENTS DATA OUTPUT METHOD, AND CONTENTS DATA OUTPUT PROGRAM

(75) Inventor: Masato Kobayashi, Tokyo (JP)

(73) Assignees: Mitsuhisa Kamachi, Tokyo (JP); Masato Kobayashi, Tokyo (JP); Shigehiko Araki, Moriya-shi (JP)

( * ) Notice: Subject to any disclaimer, the term of this patent is extended or adjusted under 35 U.S.C. 154(b) by 102 days.

(21) Appl. No.: 12/679,149

(22) PCT Filed: Sep. 28, 2007

(86) PCT No.: PCT/JP2007/068960
§ 371 (c)(1),
(2), (4) Date: Mar. 19, 2010

(87) PCT Pub. No.: WO2009/040931
PCT Pub. Date: Apr. 2, 2009

(65) Prior Publication Data
US 2010/0312853 A1  Dec. 9, 2010

(51) Int. Cl.
*G06F 15/16* (2006.01)
(52) U.S. Cl. ........ 709/217; 709/218; 709/219; 709/230; 709/236; 709/203
(58) Field of Classification Search .......... 709/217–219, 709/230, 236, 203
See application file for complete search history.

(56) References Cited

U.S. PATENT DOCUMENTS
6,317,784 B1 * 11/2001 Mackintosh et al. ......... 709/219
2002/0199188 A1 * 12/2002 Sie et al. ......................... 725/35

FOREIGN PATENT DOCUMENTS
JP  5-219053  8/1993
(Continued)

OTHER PUBLICATIONS
International Search Report for International Application No. PCT/JP2004/007051 dated Jun. 22, 2004.

*Primary Examiner* — Wing F Chan
*Assistant Examiner* — Benjamin M Thieu
(74) *Attorney, Agent, or Firm* — Kratz, Quintos & Hanson, LLP (57) ABSTRACT

[PROBLEMS] To surely deliver additional data to be delivered with contents data at a desired timing, and allow a delivery result to be easily confirmed.
[MEANS FOR SOLVING PROBLEMS] When the contents data is acquired in real time from the delivery apparatus 5 by the contents data acquiring device 11a, the contents data is outputted to a display or the like and displayed in real time by the contents data outputting device 11b. At the same time, the additional data corresponding to the contents data is acquired from the delivery apparatus 5 by the additional data acquiring device 11c, the available data is acquired from the delivery apparatus 5 by the available data acquiring device 11d, and the additional data outputting period is calculated based on the available data by the additional data outputting period calculating device 11e. The additional data is outputted to a display or the like and displayed in the additional data outputting period by the additional data outputting device 11f, and is stopped outputting in response to an end of the additional data outputting period.

4 Claims, 7 Drawing Sheets

FOREIGN PATENT DOCUMENTS

| | | |
|---|---|---|
| JP | 10-285460 | 10/1998 |
| JP | 10-336169 | 12/1998 |
| JP | 2000-222360 | 8/2000 |
| JP | 2001-86420 A1 | 3/2001 |
| JP | 2002-358283 A1 | 12/2002 |
| JP | 2005-252650 A1 | 9/2005 |
| JP | 2007-88704 A1 | 4/2007 |
| WO | WO 2005/006616 A1 | 1/2005 |

* cited by examiner

FIG. 7

CONTENTS DATA OUTPUT APPARATUS, CONTENTS DATA DELIVERY SYSTEM, CONTENTS DATA OUTPUT METHOD, AND CONTENTS DATA OUTPUT PROGRAM

TECHNICAL FIELD

This invention relates to a contents data output apparatus, a contents data delivery system, a contents data output method, and a contents data output program to output contents data to be delivered so that the same contents data are outputted to a plurality of delivery destinations at the same time, and to output additional data corresponding to the contents data.

BACKGROUND

Various contents data is delivered due to the growth of the Internet. A streaming technique to play back audio or video data while downloading is known. Merits of the streaming technique are that a user can select the desired movie or music for 24 hours without distance and time limitation, there is no need to download, and we can obtain multiple data linked to website. In the streaming technique, various techniques shown in Patent Document 1 are known as a copy-protection technology for the contents data.

Patent Document 1: JP, A, 2007-88704

DISCLOSURE OF THE INVENTION

Problem to be Solved by the Invention

As described the above, when the contents data is delivered, copyright or the like of the contents data can be protected. However, when additional data such as data regarding the contents or advertisement is added to the contents data, there is a problem described below due to a merit that a user can select a desired movie or music for 24 hours using the conventional streaming technique. There is a problem that it is difficult to output the additional data at desired timing by only associating the contents data with the additional data. For example, when a user plays back contents data streaming late in the night, the additional data to be streamed in the morning may be streamed. Therefore, a server for delivering the contents data may manage the time zone of the additional data to be added. However, it leads to a problem that the process may be complex when the contents data is delivered to a plurality of client computers.

Accordingly, in view of the above problems, it is an object of the present invention to provide a contents data output apparatus, a contents data delivery system, a contents data output method, and a contents data output program to surely deliver additional data to be delivered together with contents data at desired timing, and to allow a delivery result to be easily confirmed.

Means for Solving Problem

Figure 1:
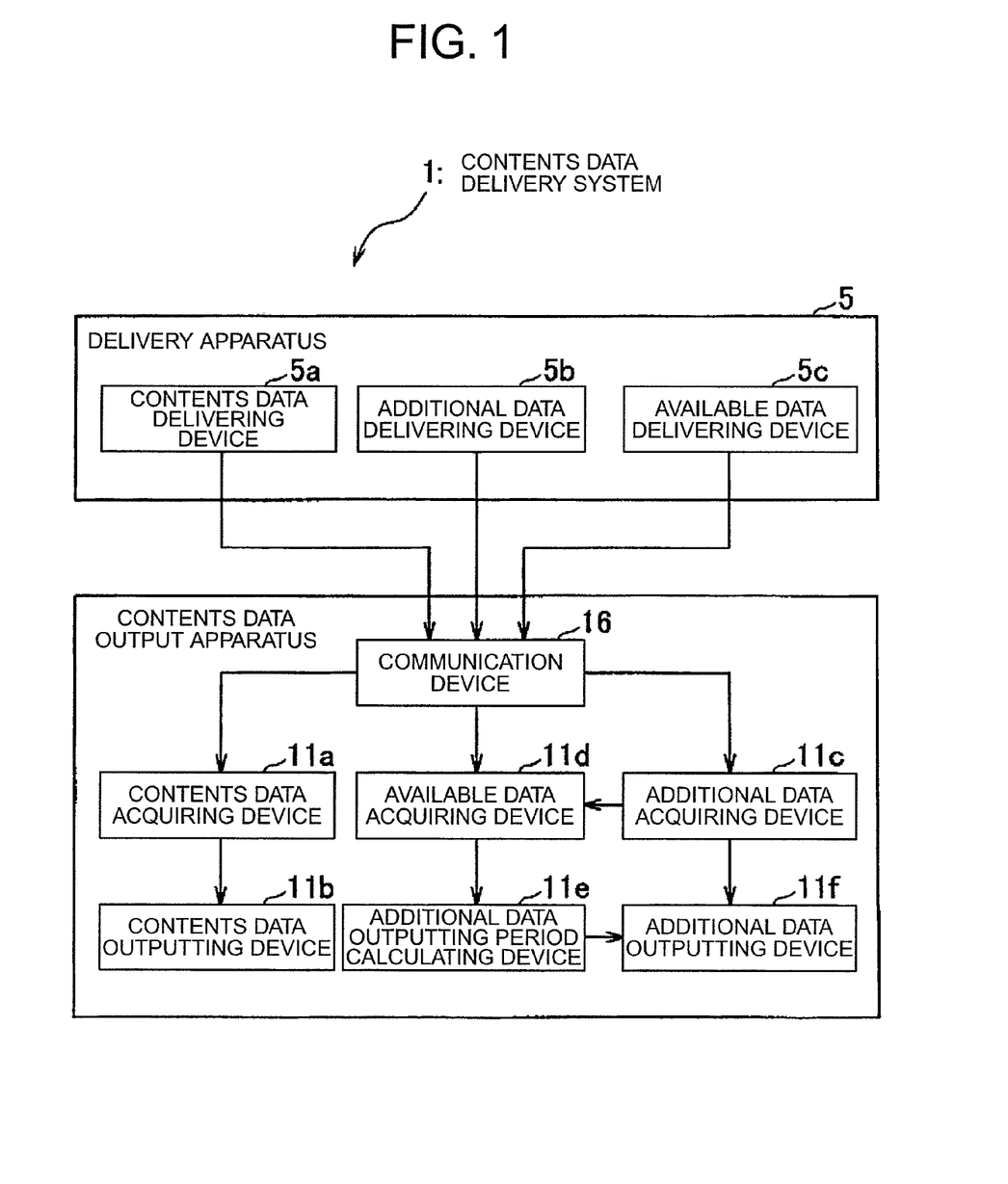
FIG. 1 A configuration diagram showing a basic configuration of a contents data output apparatus and a contents data delivery system.

For attaining the object, as shown in a basic configuration diagram in FIG. 1, there is provided a contents data output apparatus having a communication device 16 to communicate with a delivery apparatus 5 to deliver continuously a plurality types of contents data in an arbitrary order, and to deliver additional data corresponding to the contents data so that the same contents data is outputted at the same time in all of delivery destinations, said contents data output apparatus including:

a contents data acquiring device 11a to acquire in real time the contents data delivered from the delivery apparatus 5 via the communication device 16;

a contents data outputting device 11b to output in real time the contents data acquired by the contents data acquiring device 11a;

an additional data acquiring device 11c to acquire the additional data corresponding to the contents data outputted by the contents data outputting device 11b from the delivery apparatus 5 via the communication device 16;

an available data acquiring device 11d to acquire available data for identifying an available period of the additional data acquired by the additional data acquiring device 11c from the delivery apparatus 5 via the communication device 16;

an additional data outputting period calculating device 11e to calculate an additional data outputting period for outputting the additional data acquired by the additional data acquiring device 11c based on the available data acquired by the available data acquiring device 11d; and an additional data outputting device 11f to output the additional data acquired by the additional data acquiring device 11c in the additional data outputting period calculated by the additional data outputting period calculating device 11e, and to stop outputting the additional data in response to an end of the additional data outputting period.

According to the contents data output apparatus of the present invention, when the contents data is acquired in real time from the delivery apparatus 5 by the contents data acquiring device 11a, the contents data is outputted in real time to a display or the like by the contents data outputting device 11b, and displayed. At the same time, the additional data corresponding to the contents data is acquired from the delivery apparatus 5 by the additional data acquiring device 11c, and the available data is acquired from the delivery apparatus 5 by the available data acquiring device 11d. Then, the additional data outputting period calculating device 11e calculates the additional data outputting period based on the available data. Then, in the additional data outputting period, the additional data is outputted and displayed on the display or the like by the additional data outputting device 11f, and the additional data is stopped outputting in response to the end of the additional data outputting period.

As shown in the basic configuration diagram in FIG. 1, the additional data acquiring device 11c acquires the additional data to be delivered next by the delivery apparatus 5 at acquiring timing determined arbitrarily in the additional data outputting period, the available data acquiring device 11d acquires the available data corresponding to the additional data to be delivered next, and the additional data outputting period calculating device 11e calculates the additional data outputting period based on the available data corresponding to the additional data to be delivered next.

According to the contents output apparatus, at the acquiring timing arbitrarily determined in the additional data outputting period, the additional data acquiring device 11c acquires the additional data to be delivered next by the delivery apparatus 5, and the available data acquiring device 11d acquires the available data. Then, based on the available data, the output period of the additional data to be outputted next is calculated. Thus, the additional data outputting device 11f can output a plurality of additional data changed timely.

For attaining the object, as shown in a basic configuration diagram in FIG. 1, there is provided a contents data delivery system in order that the same contents data is outputted at the same time in all of delivery destinations, said contents data delivery system including:

a delivery apparatus 5 having:

a contents data delivering device 5a to continuously deliver a plurality types of contents data in an arbitrary order;

an additional data delivering device 5b to deliver additional data corresponding to the contents data delivered by the contents data delivering device 5a; and an available data delivering device 5c to deliver available data for identifying an available period of the additional data, and the contents data output apparatus, wherein the contents data acquiring device 11a of the contents data output apparatus acquires the contents data from the contents data delivering device 5a, wherein the additional data acquiring device 11c of the contents data output apparatus acquires the additional data from the additional data delivering device 5b, and wherein the available data acquiring device 11d of the contents data output apparatus acquires the available data from the available data delivering device 5c.

According to the contents data delivery system of the present invention, when the contents data acquiring device 11a of the contents data output apparatus acquires in real time the contents data from the contents data delivering device 5a of the delivery apparatus 5, the contents data outputting device 11b of the contents data output apparatus outputs in real time the contents data. Further, the additional data acquiring device 11c acquires the additional data corresponding to the contents data from the additional data delivering device 5b of the delivery apparatus 5, and the available data acquiring device 11d acquires the available data corresponding to the additional data. Then, after the additional data outputting period calculating device 11e calculates the additional data outputting period, the additional data outputting device 11f outputs the additional data in the additional data outputting period to a display or the like so that the additional data is displayed, and stops outputting the additional data in response to an end of the additional data outputting period.

For attaining the object, there is provided a contents data output method using a contents data output apparatus having a communication device communicating with a delivery apparatus for continuously delivering a plurality types of contents data in an arbitrary order and delivering additional data corresponding to the contents data so that the same contents data is outputted at the same time in all of delivery destinations, said method including the steps of:

a contents data acquiring step to acquire in real time the contents data from the delivery apparatus via the communication device;

a contents data outputting step to output in real time the contents data acquired in the contents data acquiring step;

an additional data acquiring step to acquire the additional data corresponding to the contents data outputted in the contents data outputting step from the delivery apparatus via the communication device;

an available data acquiring step to acquire available data for identifying an available period of the additional data acquired in the additional data acquiring step from the delivery apparatus via the communication device;

an additional data outputting period calculating step to calculate an additional data outputting period for outputting the additional data acquired in the additional data acquiring step based on the available data acquired in the available data acquiring step; and an additional data outputting step to output the additional data acquired in the additional data acquiring step in the additional data outputting period calculated in the additional data outputting period calculating step, and to stop outputting the additional data in response to an end of the additional data outputting period.

According to the contents data output method of the present invention, when the contents data output apparatus acquires in real time the contents data from the delivery apparatus 5, the contents data output apparatus outputs in real time to a display or the like. Further, the contents data output apparatus acquires the additional data corresponding to the contents data and the available data from the delivery apparatus 5, and calculates the additional data outputting period of the additional data. Then, the contents data output apparatus outputs the additional data in the additional data outputting period, and stops outputting the additional data in response to the end of the additional data outputting period.

For attaining the object, as shown in a basic configuration diagram in FIG. 1, there is provided a contents data output program to operate a computer of a contents data output apparatus having a communication device 16 communicating with a delivery apparatus 5 for continuously delivering a plurality types of contents data in an arbitrary order and delivering additional data corresponding to the contents data so that the same contents data is outputted at the same time in all of delivery destinations, said method to operate the computer as:

a contents data acquiring device 11a to acquire in real time the contents data delivered from the delivery apparatus 5 via the communication device 16;

a contents data outputting device 11b to output in real time the contents data acquired by the contents data acquiring device 11a;

an additional data acquiring device 11c to acquire the additional data corresponding to the contents data outputted by the contents data outputting device 11b from the delivery apparatus 5 the communication device 16;

an available data acquiring device 11d to acquire available data for identifying an available period of the additional data acquired by the additional data acquiring device 11c from the delivery apparatus 5 via the communication device 16;

an additional data outputting period calculating device 11e to calculate an additional data outputting period for outputting the additional data acquired by the additional data acquiring device 11c based on the available data acquired by the available data acquiring device 11d; and an additional data outputting device 11f to output the additional data acquired by the additional data acquiring device 11c in the additional data outputting period calculated by the additional data outputting period calculating device 11e, and to stop outputting the additional data in response to an end of the additional data outputting period.

According to the contents data output program of the present invention, when the computer acquires in real time the contents data from the delivery apparatus 5, the computer outputs in real time the contents data to a display or the like. Further, the computer acquires the additional data corresponding to the contents data and the available data corresponding to the additional data from the delivery apparatus 5, calculates the additional data outputting period based on the available data, outputs the additional data in the additional data outputting period, and stops outputting the additional data in response to the end of the additional data outputting period.

Advantageous Effects of Invention

When the contents data output apparatus outputs in real time the contents data from the delivery apparatus, the contents data output apparatus acquires the additional data corresponding to the contents data and the available data, calculates the additional data outputting period based on the available data, and outputs the additional data only in the additional data outputting period. Therefore, the delivery apparatus only manages the additional data to be added to the contents data, so that the additional data to be delivered with the contents data is surely delivered to users at desired timing. Further, an output control of the additional data and a confirmation of the output result at the contents data output apparatus become unnecessary. Therefore, because the additional data corresponding to the contents data is surely delivered at desired timing without increasing a processing load at the delivery apparatus side, a commodity value of the contents data and the additional data can be increased, and the contents dada and the additional data can contribute to improve service for users.

The next additional data and the available data corresponding to the next additional data is acquired from the delivery apparatus at arbitrary timing in the additional data outputting period, and the next additional data outputting period is calculated. Therefore, because the additional data outputting periods corresponding to a plurality of additional data can be calculated continuously, a plurality of additional data can be switched timely to be displayed. Therefore, because a plurality of additional data corresponding to the contents data can be surely delivered at desired timing, the commodity value of the contents data and the additional data can be further improved.

EXPLANATIONS OF LETTERS OR NUMERALS 1 contents data delivery system
5 delivery apparatus
5a contents data delivering device
5b additional data delivering device
5c available data delivering device
10 contents data output apparatus
11a contents data acquiring device
11b contents data outputting device
11c additional data acquiring device
11d available data acquiring device
11e additional data outputting period calculating device
11f additional data outputting device
D1 contents data
D2 additional data
D3 available data

BEST MODE FOR CARRYING OUT THE INVENTION

Hereinafter, an embodiment of a contents data output apparatus, a contents data delivery system, a contents data output method, and a contents data output program according to the present invention in which music is a contents data to be delivered will be explained with reference to FIGS. 2 to 8.

Figure 2:
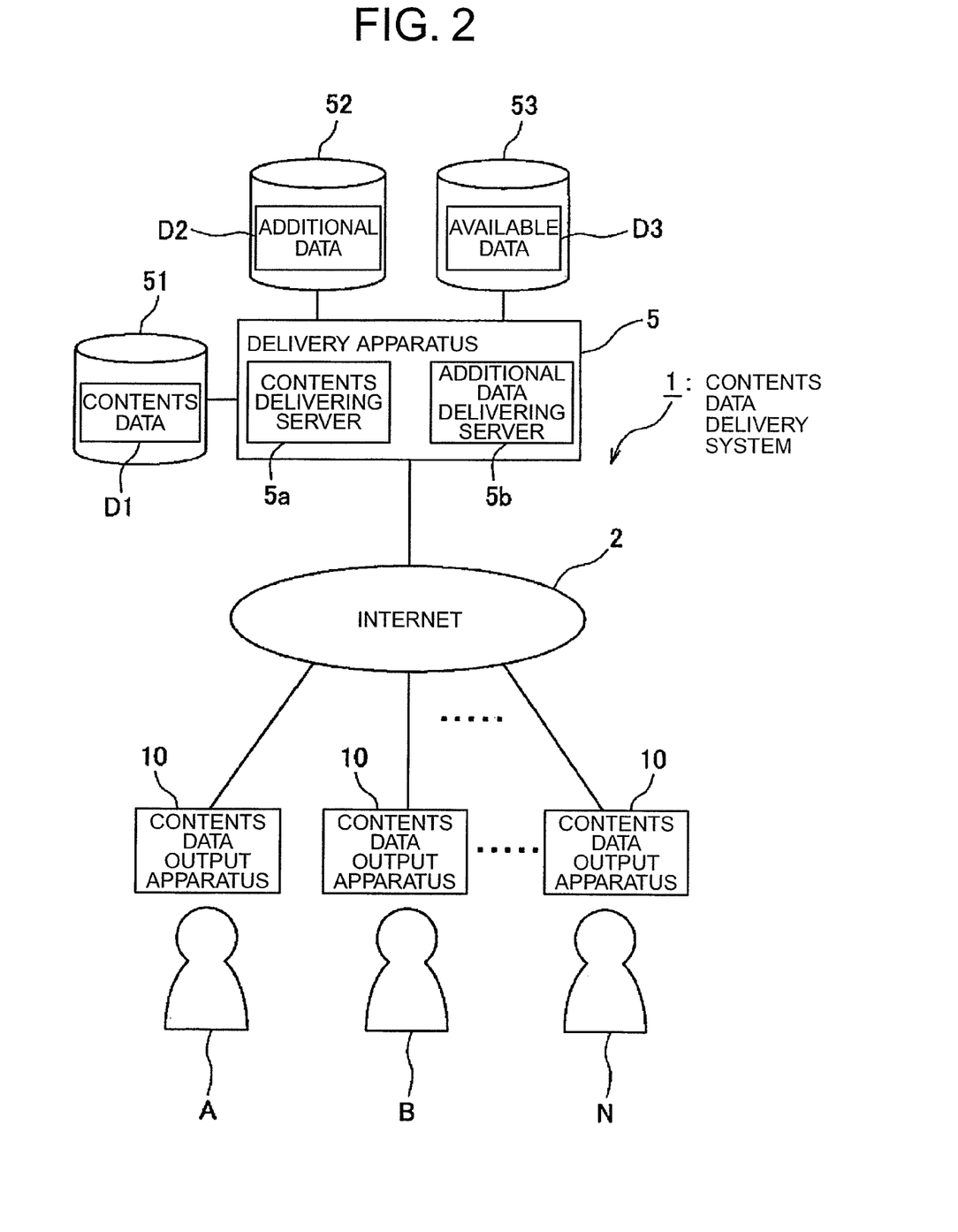
FIG. 2 A system configuration diagram showing a schematic system diagram of the contents data output apparatus and the contents data delivery system.

In FIG. 2, a contents data delivery system 1 includes: a delivery apparatus 5 to be installed on a music delivery company or the like; and contents data output apparatuses 10 which are respectively owned by members A to N registered to the music delivery company.

Figure 3:
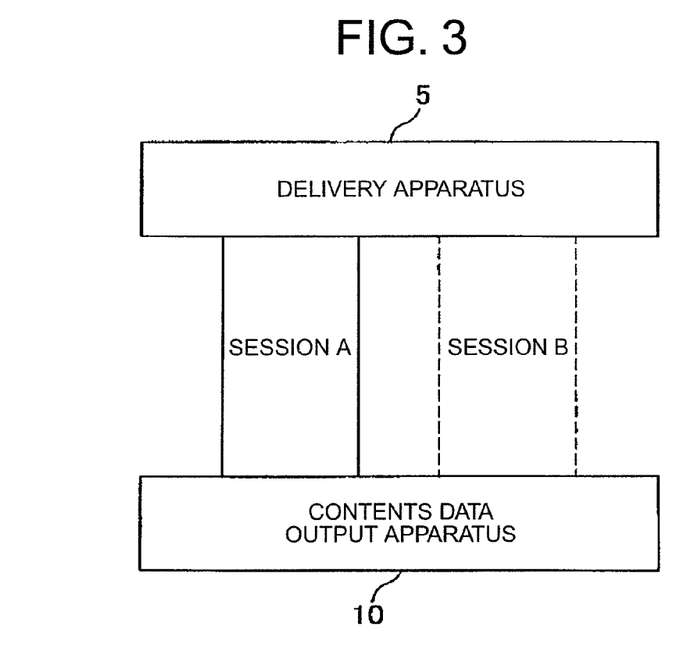
FIG. 3 An explanatory view for explaining a communication between the contents data output apparatus and the delivery apparatus in FIG. 2.

The delivery apparatus 5 can communicate with the contents data output apparatuses 10 via the internet. As shown in FIG. 3, when the delivery apparatus 5 communicates with the contents data output apparatuses 10, sessions A and B are established between the delivery apparatus 5 and the contents data output apparatuses 10. The session A communicates later-described contents data D1, and is established continuously while the contents data D1 is delivered. The session B communicates various data such as later-described additional data D2, available data D3, and is established and disconnected when the communication is done. Incidentally, the communication between the delivery apparatus 5 and the contents data output apparatuses 10 may be done directly by wireless or wired communication. Further, in this embodiment, the communication is via the internet, however, the present invention is not limited to this, and various communication systems can be used.

A computer or the like having a communicating device is used as the delivery apparatus 5, and an accessible storage medium thereof stores a contents data database (DB) 51 storing the contents data D1, an additional data database (DB) 52 storing the additional data D2, and an available data database (DB) 53 storing the available data D3 corresponding to the additional data D2.

In this embodiment, for simplifying the explanation, one contents data DB 51 delivers the common contents data D1 to the members A to N. The additional data D2 corresponds to, for example, time zone, time and date, a type of the contents, or the like of the contents data D1. The additional data D2 and the available data D3 relate to each other one to one. Further, by providing a plurality of contents data databases 51, the system deals with various members.

The contents data D1 is composed of well-known sound file, video file or the like, and in particular, includes MP3 (MPEG Audio Layer-3), AAC (Advanced Audio Coding) or the like. Incidentally, various data such as movie data, picture data or the like can be selected arbitrarily as the contents data D1, also referred to herein as "audio-visual content". The additional data D2 can be arbitrarily set from among the various data such as Jackets or song lists of the contents data D1, album information of a singer correspond to the contents data D1, what's new of a fan club, information for members, link data (such as URL) to various data corresponding to the contents data D1, commercial information, newly arrived e-mail data of a member's personal mail, and updated on a timely basis. The additional data D2 will also be referred to herein as "content description".

The available data (or, availability data) D3 identifies an available period of the corresponding additional data 2. For example, the available data D3 is composed of delivery start time of the additional data D2 from the delivery apparatus 5, a length of the additional data or the like. Therefore, the contents data output apparatus 10 can identify an additional data outputting period by referring the delivery start time of the availability data and the length of the additional data. The availability data D3 is described by a "timing description".

The delivery apparatus 5 stores various programs such as a contents data delivery server program 5a for making the computer operate as the contents data delivering device, and an additional data delivery server program 5b for making the computer operate as the additional data delivering device and the available data delivering device in an internal hard disk drive or the like.

When the delivery apparatus 5 runs programs, the contents data delivery server program 5a prepares, for each of predetermined delivery items (for example, one singer, a group of singers, or the like), a streaming file and a delivery schedule for a specific period (for example, one day, one week, one month or the like) collected from the contents data DB 51. Thus, the delivery schedule (output time axis of the contents data D1) of the contents data D1 corresponding to the delivery item is determined. Incidentally, as a preparing method of the streaming file, various methods such as arranging the contents data D1 in a specific order, extracting and arranging impressive parts of songs from the contents data D1 or the like can be used.

The contents data delivery server program 5a transmits and receives various data to the contents data output apparatuses 10 via the session B, and authenticate the members A to N. Then, the contents data DB 51 is identified by the delivery items which are previously registered by the members A to N. Then, a communication path to indicate a link to the streaming file of the identified contents data DB 51 is sent to the contents data output apparatuses 10 via the session B. Then, when the contents data output apparatus 10 accesses a streaming point via the session A, the delivery apparatus 5 keeps on sending in real time via the session A the contents data D1 from an access time point of the delivery schedule. Thus, even if the access start time of a plurality of contents data output apparatuses 10 are not the same, the same contents data D1 is outputted to a plurality of delivery destinations at the same time.

Further, the additional data delivery server program 5b outputs the additional data D2 corresponding to the contents data D1 which is started delivering via the session A, and the available data D3 of the contents data D1 to the contents data output apparatus 10 via the session B. When the additional data delivery server program 5b delivers the available data D3, the additional data delivery server program 5b sets the delivery start time and outputs in addition to the predetermined data length or the like of the additional data D2 to the contents data output apparatus 10 via the session B.

Incidentally, in this embodiment, a plurality of additional data D2 is delivered based on the predetermined time table or the like. However, the present invention is not limited to this. Various embodiments can be used, for example, the additional data D2 may be in response to the contents data D1.

Figure 4:
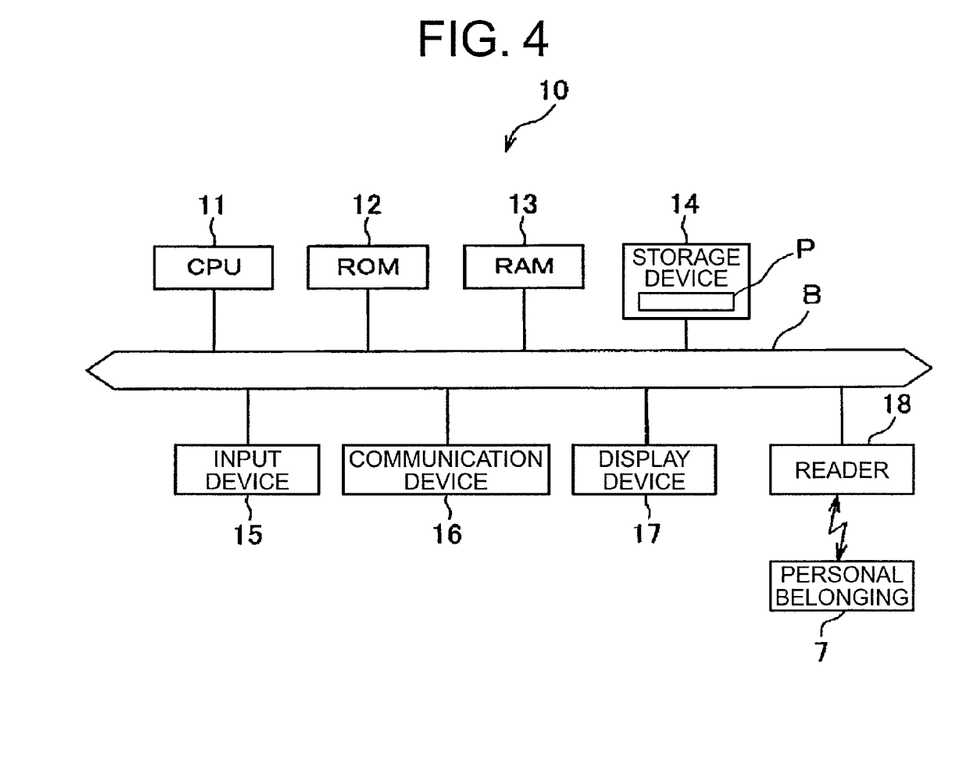
FIG. 4 A configuration diagram showing an embodiment of a schematic configuration of the contents data output apparatus in FIG. 2.

Next, a well-known computer is used to realize the contents data output apparatus 10. As shown in FIG. 4, the computer includes a CPU 11 for control a whole device according to a predetermined program. A ROM 12 as a read-only memory storing a program for the CPU 11 and a RAM 13 as a readable and writable memory having a work area for storing various data needed for the CPU 11 operation are connected to the CPU 11 via a bus B.

A storage device 14 is connected to the CPU 11 via the bus B. A hard disk drive, a high-capacity memory or the like is used as the storage device 14. The storage device 14 has a memory area for storing various programs such as a contents data output program, and various data. The contents data output program or the like is downloaded via the internet 2, or installed from a storage medium such as CD-ROM to be stored in the storage device 14.

As shown in FIG. 1, the contents data output program P makes the CPU (computer) of the contents data output apparatus, having a communication device 16 to communicate with the delivery apparatus 5 which delivers a plurality types of contents data arbitrarily switchable and delivers the additional data associated with the contents data for outputting the same contents data at the same time in all of the delivery destinations, operate as the contents data acquiring device 11a to acquire in real time the contents data from the delivery apparatus 5 via the communication device 16, operate as the contents data outputting device 11b to output in real time the contents data acquired by the contents data acquiring device 11a, operate as the additional data acquiring device 11c to acquire the additional data corresponding to the contents data outputted by the contents data outputting device 11b from the delivery apparatus 5 via the communication device 16, operate as the available data acquiring device 11d to acquire the available data for identifying the available period of the additional data acquired by the additional data acquiring device 11c from the delivery apparatus 5 via the communication device 16, operate as the additional data outputting period calculating device 11e to calculate, the additional data outputting period for outputting the additional data acquired by the additional data acquiring device 11c based on the available data acquired by the available data acquiring device 11d, and operate as the additional data outputting device 11f to output the additional data acquired by the additional data acquiring device 11c in the additional data outputting period calculated by the additional data outputting period calculating device 11e, and to stop outputting the additional data in response to an end of the additional data outputting period.

As shown in FIG. 4, the CPU 11 is connected to an input device 15, the communication device 16, a display device 17, and a reader 18 via the bus B. The input device 15 includes a keyboard, a mouse, and the like, and outputs input data in response to an operation of a user to the CPU 11. A LAN card, a modem for mobile phone or the like which is fitted to an installation environment is used as the communication device 16 and works as communication means. Further, the communication device 16 outputs the received data to the CPU 11, and send the data inputted from the CPU 11 to an ordered destination.

A well-known LCD display, CRT, or the like is used as the display device 17. The display device 17 includes a not-shown display unit to display various data controlled by the CPU 11, and a not-shown audio output unit to output an audio or the like. Namely, the display device 17 displays (outputs) the contents data D1, the additional data D2 and the like delivered from the delivery apparatus 5 based on the various data.

A contactless reader/writer or the like to exchange various data to a card storing at least one of electric money data, credit card data, and member data, or a mobile phone which is a personal belonging 7 of the members A to N is used as the reader 18. The reader 18 outputs readout data read out from the personal belonging 7 to the CPU 11. Incidentally, the readout data is, for example, identification data uniquely assigned to the personal belonging 7, or identification data of a owner to be used as an authentication of the members A to N. Further, if the electric money data stored in a memory medium of the personal belonging 7 is acquired as the readout data, a system offering paid contents data D1 can be constructed.

Incidentally, in this embodiment, members A to N are authenticated based on the readout data read out from the personal belonging 7. However, the present invention is not limited to this. Various embodiments can be used. For example, the member may be authenticated based on authentication data previously stored in the storage device 14. For another example, the member may be authenticated based on input data such as password inputted from the input device 15 in response to an input screen displayed on the display device 17.

Next, an embodiment of a contents data output processing when the CPU 11 executes the contents data output program P will be explained with reference to flowcharts in FIGS. 5 and 6.

Figure 5:
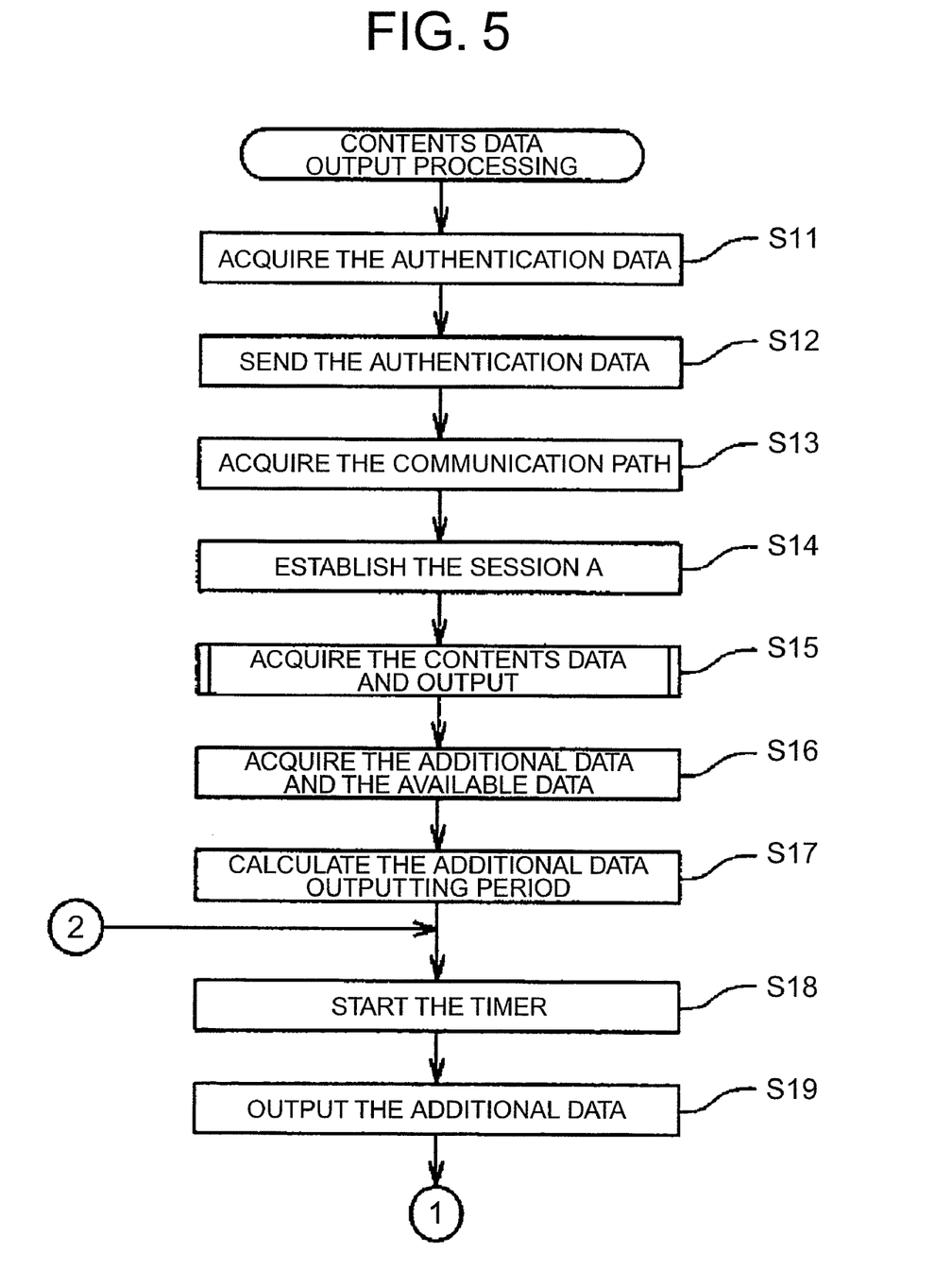
FIG. 5 A flowchart showing a part of a contents data output processing executed by CPU in FIG. 4.

When the CPU 11 executes the contents data output program P, in step S11 shown in FIG. 5, the authentication data is acquired from the readout data by the reader 18 and stored in the RAM 13. In step S12, the authentication data is outputted to the communication device 16 wherein the destination is the delivery apparatus 5, so that the authentication data is sent to the delivery apparatus 5 by the communication device 16. Then, the process goes to step S13.

In step S13, when the communication device 16 receives the communication path data in response to the authentication of the delivery apparatus 5, the communication path data is acquired and stored in the RAM 13. In step S14, the session A is established via the communication device 16 to the streaming point indicated by the communication path data. In step S15, the contents data D1 delivered from the streaming point of the delivery apparatus 5 is acquired in real time. When outputting the contents data D1 in real time to an output portion of the display device 17 or the like, streaming software is executed to output the contents data D1 to the members A to N from the output portion or the like. Then, the process goes to step S16. Incidentally, the streaming software keeps on processing while the session A is established, and stops processing in response to a break of the session A.

In step S16, the session B is established to the delivery apparatus 5 via the communication device 16, and the additional data D2 and the available data D3 are acquired from the delivery apparatus 5 via the session B, then, the session B is broken. Then, in step S17, the additional data outputting period is calculated based on the length data and the delivery start time data of the additional data D2 in the available data D3 and stored in the RAM 13 or the like, then the process goes to step S18.

Incidentally, as a specific example of calculation of the additional data outputting period, various embodiments can be used, such that the additional data outputting period is calculated based on the delivery start time and the delivery stop time. Alternatively, the ending time of the additional data D2 is acquired as the available data D3, and the additional data outputting period is set from the acquiring time of, the additional data D2 to the ending time.

In step S18, a timer which becomes timeout when the time to acquiring timing arbitrarily determined with respect to the calculated additional data outputting period is over is started. In step S19, when the additional data D2 is outputted to the display device 17, the additional data D2 is outputted to the members A to N from the display device 17, then the process goes to step S20 shown in FIG. 6. Incidentally, the acquiring timing is, for example, considering the required time to acquire the next additional data D2, set before a specific time from the end of the additional data outputting period, so that a switching of the additional data D2 can be done smoothly.

Incidentally, an output from the display device 17 is varied corresponding to the configuration of the additional data D2, for example, if the additional data D2 is audio, the output is outputted from the audio output portion, if the additional data D2 is image or video, the output is outputted from the display portion. Further, if application software is required for outputting the additional data D2, the software is started to play back when the additional data D2 is outputted.

In step S20, whether the above-described timer is timeout or not is judged. If judged that the timer is not timeout ("N" in step S20), the time is regarded as to be in the additional data outputting period, and the process goes to step S24. Meanwhile, if judged that the timer is timeout ("Y" in step S20), the process goes to step S21.

In step S21, the session B is established again to the delivery apparatus 5 via the communication device 16. The next additional data D2 and the available data D3 are acquired from the delivery apparatus 5 via the session B, and then the session B is broken. Then, in step S22, the next additional data outputting period is calculated based on the length data and the delivery start time data of the additional data D2 of the available data D3, and stored in the RAM 13 or the like, then the process goes to step S23. Incidentally, it is arbitrarily determined that the next additional data outputting period may be continued from the previous additional data outputting period or a desired period may be inserted therebetween.

In step S23, whether the additional data outputting period is end or not is judged using time and date of a watch IC, a counter or the like. If judged that the additional data outputting period is end ("Y" in step S23), the process goes back to step S18 shown in FIG. 5, and a series of processings described above is done with respect to the next additional data D2. Meanwhile, if judged that the additional data outputting period is not end ("N" in step S23), the process goes to step S24.

In step S24, whether a termination request due to an operation of the members A to N or the like is generated or not is judged based on the input data from the input device 15 or the like. If judged that the termination request is not generated ("N" in step S24), the process goes back to S20, and a series of processings is repeated. Meanwhile, if judged that the termination request is generated ("Y" in step S24), the process goes to step S25.

In step S25, an output stop is requested to the communication device 16, and outputs of the contents data D1 and the additional data D2 are stopped. Then, in step S26, the session A is broken, and the process is ended.

Figure 6:
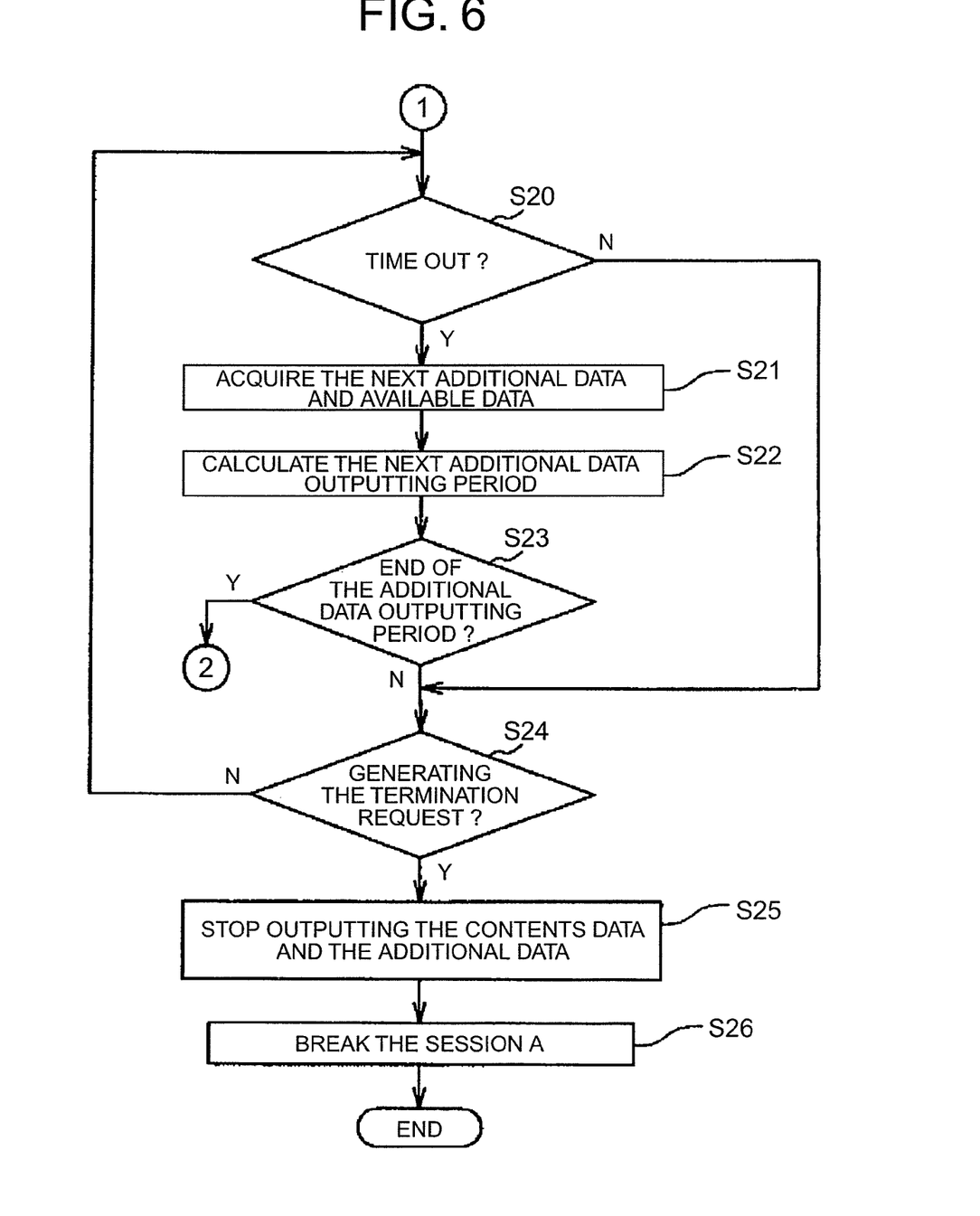
FIG. 6 A flowchart showing another part of a contents data output processing executed by CPU in FIG. 4.

When the CPU 11 executes the contents data output processing shown in FIGS. 5 and 6, the CPU 11 works as the contents data acquiring device, the contents data outputting device, the additional data acquiring device, the available data acquiring device, the additional data outputting period calculating device, and the additional data outputting device claimed in claims. Further, the step S15 of the flowcharts shown in FIGS. 5 and 6 corresponds to the contents data acquiring device and the contents data outputting device. The step S16 and S22 correspond to the additional data acquiring device and the available data acquiring device. The step S17 and S22 correspond to the additional data outputting period calculating device. The step S19 corresponds to the additional data outputting device.

Figure 7:
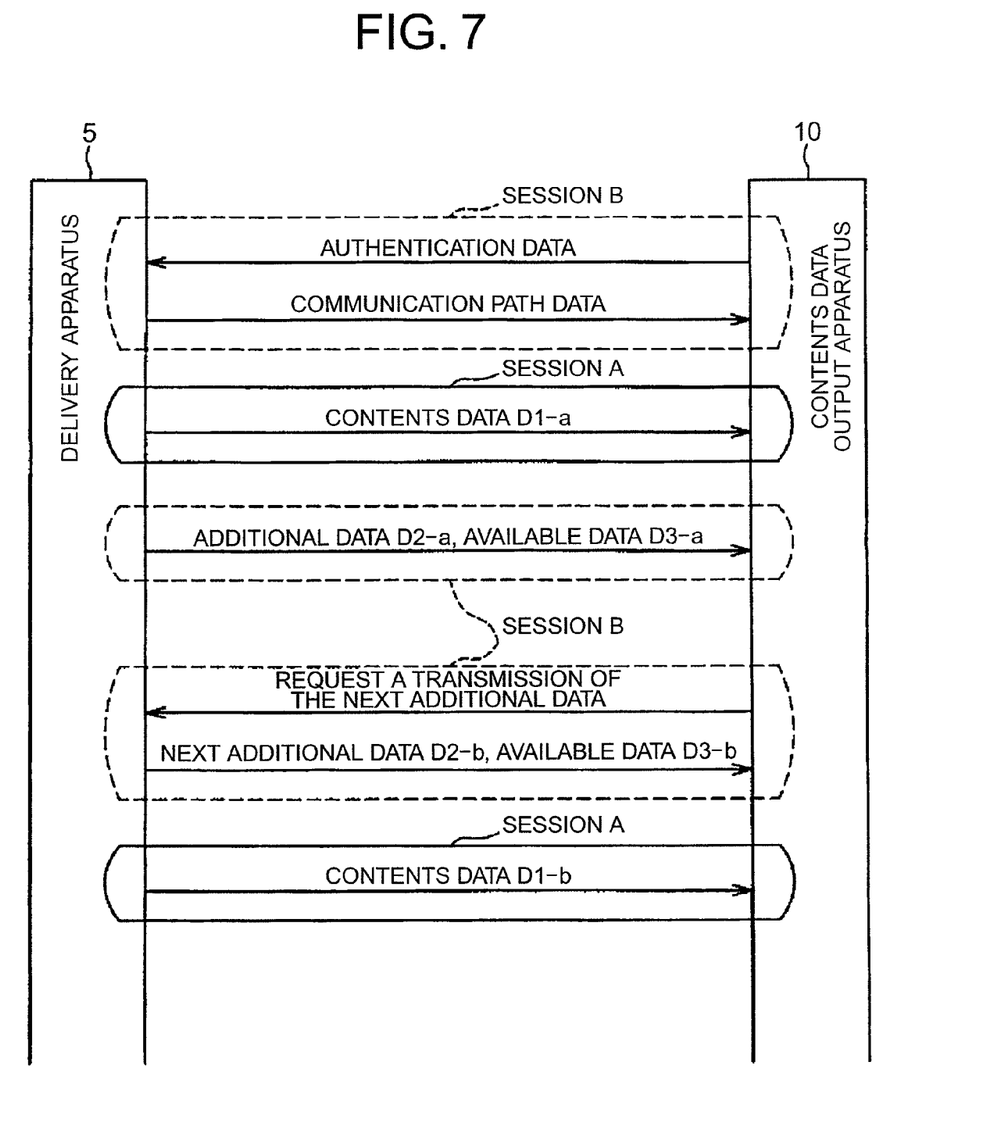
FIG. 7 A data-flow diagram showing an embodiment of a communication between the contents data output apparatus and the delivery apparatus.

Next, an embodiment of operations of the delivery apparatus 5 and the contents data output apparatus 10 in the contents data delivery system 1 will be explained with reference to FIGS. 7 and 8. Incidentally, FIG. 7 shows a data-flow diagram between the delivery apparatus 5 and the contents data output apparatus 10, and time flows from a top to a bottom of FIG. 7.

When the computer works as the contents data output apparatus 10 in response to the execution of the contents data output program P by the members A to N, the contents data output apparatus 10 establishes the session B to the delivery apparatus 5, and send the authentication data acquired from the personal belonging 7 of the members A to N. Then, the contents data output apparatus 10 acquires the communication path data and breaks the session B. Incidentally, this authentication process can be omitted according to a system specification.

The contents data output apparatus 10 establishes the session A during the streaming point indicated by the communication path data, acquires the contents data D1-*a* delivered by the delivery apparatus 5 in real time, and outputs to the display device 17 in real time. This output processing continues while the session A is established.

At this time, the contents data output apparatus 10 establishes the session B, requests and acquires a transmission of the additional data D2-*a* corresponding to the contents data D1-*a* and the available data D3-*a*, breaks the session B, calculates the additional data outputting period of the additional data D2-*a* based on the available data D3-*a*, and outputs the additional data D2-*a* in the additional data outputting period.

Then, at the acquiring timing corresponding to the additional data outputting period, the contents data output apparatuses 10 establishes again the session B to the delivery apparatus 5, then, requests and acquires a transmission of the additional data D2-*b* and the available data D3-*b* delivered by the delivery apparatus 5, breaks the session B, and calculates the additional data outputting period of the additional data D2-*b* based on the available data D3-*b*. Then, when the additional data outputting period corresponding to the additional data D2-*a* is ended, the contents data output apparatuses 10 outputs the additional data D2-*b* in the additional data outputting period corresponding to the additional data D2-*b*. While the session A is established, the contents data output apparatuses 10 repeats the above described operations.

Figure 8:
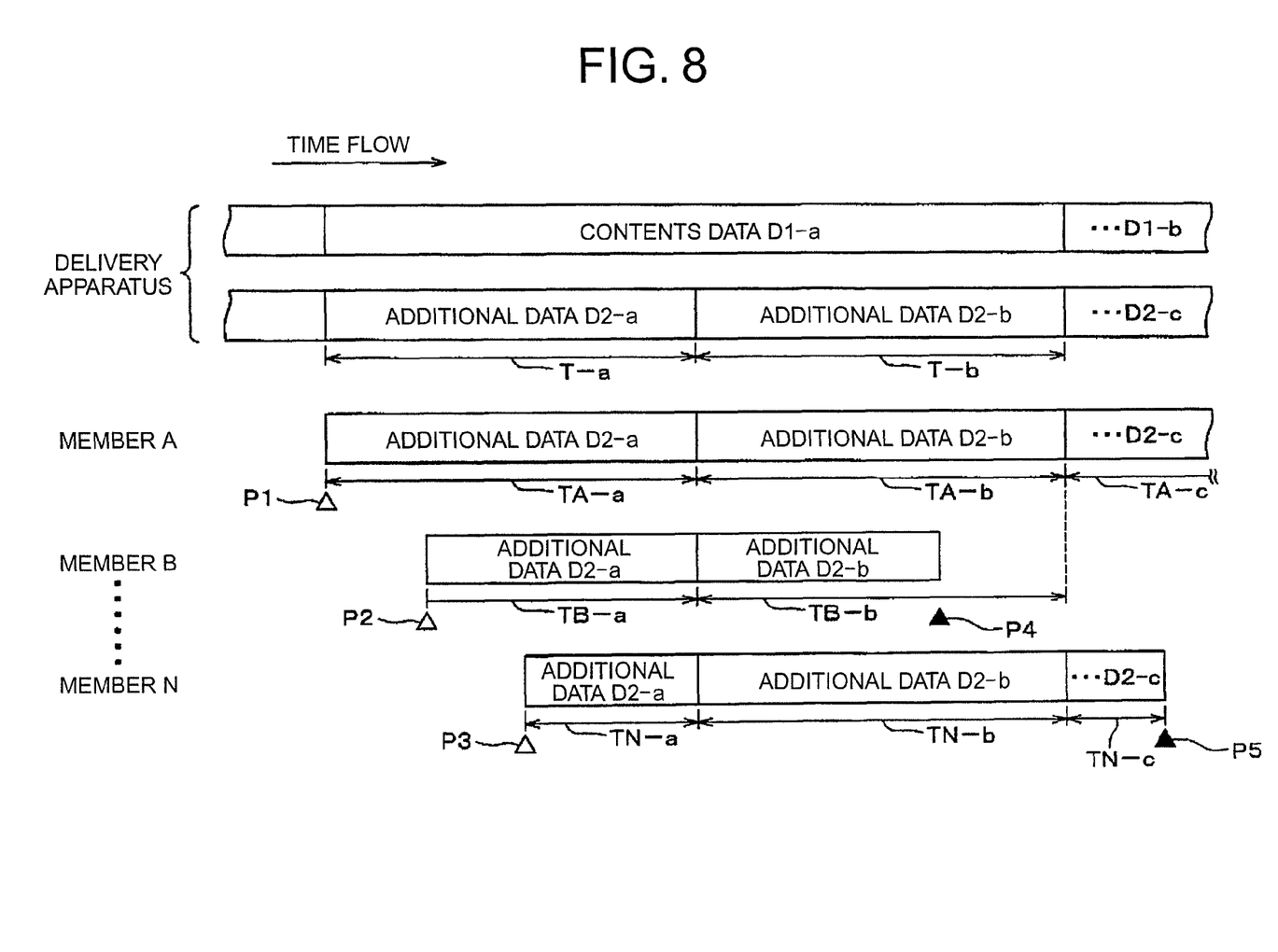
FIG. 8 An explanatory view explaining an embodiment of a delivery of the contents data and the additional data in the contents data delivery system.

More detailed operations of an embodiment that the delivery apparatus 5 delivers the contents data D1-*a* and the contents data D1-*b* as shown in FIG. 8 will be explained. Incidentally, in FIG. 8, time flows from left to right as indicated by an arrow, and white "Δ" indicates an output start point of the contents data D1, black "Δ" indicates an output stop point of the contents data D1. Regarding the contents data D1, the contents data D1 is changed, for example, from the contents data D1-*a* to the contents data D1-*b* according to the control of the delivery apparatus 5.

Further, when the contents data D1-*a* is delivered, the delivery apparatus 5 operates according to a time table in which the delivery apparatus 5 makes the contents data output apparatus 10 output the additional data D2-*a* in a first half output period T-a, and the additional data D2-*b* in a last half output period T-b.

When the contents data output apparatus 10 of the member A starts outputting the contents data D1-*a* at the point P1, the contents data output apparatus 10 also starts outputting the additional data D2-*a*. Namely, regarding the member A, the contents data output apparatus 10 outputs the additional data D2-*a* in the additional data outputting period TA-a which is equal to the output period T-a of the delivery apparatus 5. Then, the additional data outputting period is changed to the additional data outputting period TA-b, the contents data output apparatus 10 outputs the D2-*b* available data acquiring device 11*d* in a period equal to the output period T-b. Then, the contents data output apparatus 10 repeats these operations.

When the contents data output apparatus 10 of the member B starts outputting the contents data D1-*a* at the point P2, the contents data output apparatus 10 also starts outputting the additional data D2-*a*. Namely, regarding the member B, the contents data output apparatus 10 outputs the additional data D2-*a* in the additional data outputting period TB-a which is less than the output period T-a of the delivery apparatus 5. Then, the contents data output apparatus 10 starts outputting the additional data D2-*b* in the additional data outputting period TA-b which is equal to the output period T-b, however, when the member B requests an output stop of the contents data D1-*a* at the point P4, the contents data output apparatus 10 stops outputting the contents data D1-*a* and the additional data D2-*b*.

When the contents data output apparatus 10 of the member N starts outputting the contents data D1-*a* at the point P3, the contents data output apparatus 10 also starts outputting the additional data D2-*a*. Namely, regarding the member N, the contents data output apparatus 10 outputs the additional data D2-*a* in the additional data outputting period TN-a which is less than the output period T-a, the additional data outputting period TA-a, and TB-a. Then, when the additional data outputting period TN-a is changed to the additional data outputting period TN-b, the contents data output apparatus 10 outputs the additional data D2-*b* in a period equal to the output period T-b. Then, the contents data output apparatus 10 repeats these operations.

Incidentally, in FIG. 8, the additional data D2-*a* and D2-*b* are split in the output period of the contents data D1-*a*. However, the present invention is not limited to this. Various embodiments can be used. For example, only the additional data D2-*a* may be outputted in the output period of the contents data D1-*a*. Alternatively, the additional data D2-*b* may be outputted while both the contents data D1-*a* and D1-*b* are outputted.

According to the contents data delivery system 1 and the contents data output apparatus 10 described above, when the contents data output apparatus 10 outputs in real time the contents data D1 from the delivery apparatus 5, the contents data output apparatus 10 acquires the additional data D2 corresponding to the contents data D1 and the available data D3, calculates the additional data outputting period based on the available data D3, and outputs the additional data D2 only in the additional data outputting period. Therefore, the delivery apparatus 5 only manages the additional data D2 to be added to the contents data D1 so as to surely deliver the additional data D2 at a desired timing to a user. Further, it is unnecessary for the contents data output apparatus 10 to control to output the additional data D2, and to confirm the output result. Consequently, the additional data D2 corresponding to the contents data D1 is surely delivered at a desired timing without increasing the load of the delivery apparatus 5. Therefore, commodity values of the contents data D1 and the additional data D2 can be increased, and the service for users can be improved.

Further, the next additional data D2 and the available data D3 are acquired from the delivery apparatus 5 at an arbitrary timing in the additional data outputting period. Therefore, the additional data outputting periods respectively corresponding to a plurality of additional data D2 can be calculated in series, so that a plurality of additional data D2 can be timely changed over to be displayed. Therefore, because a plurality of additional data D2 corresponding to the contents data D1 can be surely delivered at a desired timing, the commodity values of the contents data D1 and the additional data D2 can be further increased.

Incidentally, in this embodiment, the contents data output apparatus 10 is realized by the personal computer. However, the present invention is not limited to this. Various embodiments can be used. For example, the contents data output apparatus 10 is realized by various devices such as a cell phone, PDA (Personal Digital Assistants) having a communication function, or the like.

Although the present invention has been fully described by way of example with reference to the accompanying drawings, it is to be understood that various changes and modifications will be apparent to those skilled in the art.

The invention claimed is:

1. An audio-visual content output apparatus having a communication device to communicate with a delivery apparatus to deliver continuously a plurality of types of audio-visual content in an arbitrary order, and to deliver content description corresponding to the audio-visual content so that the same audio-visual content is outputted at the same time in all of delivery destinations, said audio-visual content output apparatus comprising:
an audio-visual content acquiring device to acquire in real time the audio-visual content delivered from the delivery apparatus via the communication device;
an audio-visual content outputting device to output in real time the audio-visual content acquired by the audio-visual content acquiring device;
a content description acquiring device to acquire the content description corresponding to the audio-visual content outputted by the audio-visual content outputting device from the delivery apparatus via the communication device;
an availability period acquiring device to acquire a timing description for identifying an availability period of the content description acquired by the content description acquiring device from the delivery apparatus via the communication device;
a content description outputting period calculating device to calculate a content-description outputting period for outputting the content description acquired by the content description acquiring device based on the timing description acquired by the timing description acquiring device;
and a content description outputting device to output the content description acquired by the content description acquiring device in the content description outputting period calculated by the content description outputting period calculating device, and to stop outputting the content description in response to an end of the content description outputting period;
wherein the content description acquiring device acquires the content description to be delivered next by the delivery apparatus at acquiring timing determined arbitrarily in the content description outputting period,
wherein the timing description acquiring device acquires the timing description corresponding to the content description to be delivered next, and
wherein the content description outputting period calculating device calculates the content description outputting period based on the timing description corresponding to the content description to be delivered next.

2. An audio-visual content delivery system in order that the same audio-visual content is outputted at the same time in all of delivery destinations, said audio-visual content delivery system comprising:
a delivery apparatus having:
an audio-visual content delivering device to continuously deliver a plurality types of audio-visual content in an arbitrary order;
a content description delivering device to deliver content description corresponding to the audio-visual content delivered by the audio-visual content delivering device; and
a timing description delivering device to deliver timing description for identifying an availability period of the content description, and the audio-visual content output apparatus as claimed in claim 1,
wherein the audio-visual content acquiring device of the audio-visual content output apparatus acquires the audio-visual content from the audio-visual content delivering device,
wherein the content description acquiring device of the audio-visual content output apparatus acquires the content description from the content description delivering device, and
wherein the timing description acquiring device of the audio-visual content output apparatus acquires the timing description from the timing description delivering device.

3. An audio-visual content output method using a audio-visual content output apparatus having a communication device communicating with a delivery apparatus for continuously delivering a plurality types of audio-visual content in an arbitrary order and delivering content description corresponding to the audio-visual content so that the same audio-visual content is outputted at the same time in all of delivery destinations, said method comprising the steps of:
an audio-visual content acquiring step to acquire in real time the audio-visual content from the delivery apparatus via the communication device;
an audio-visual content outputting step to output in real time the audio-visual content acquired in the audio-visual content acquiring step;
a content description acquiring step to acquire the content description corresponding to the audio-visual content outputted in the audio-visual content outputting step from the delivery apparatus via the communication device;
a timing description acquiring step to acquire timing description for identifying an availability period of the content description acquired in the content description acquiring step from the delivery apparatus via the communication device;
a content description outputting period calculating step to calculate an content description outputting period for outputting the content description acquired in the content description acquiring step based on the timing description acquired in the timing description acquiring step; and
a content description outputting step to output the content description acquired in the content description acquiring step in the content description outputting period calculated in the content description outputting period calculating step, and to stop outputting the content description in response, to an end of the content description outputting period;
wherein the content description acquiring step to acquire the content description to be delivered next by the delivery apparatus at acquiring timing determined arbitrarily in the content description outputting period,
wherein the timing description acquiring step to acquire the timing description corresponding to the content description to be delivered next, and
wherein the content description outputting period calculating step to calculate the content description outputting period based on the timing description corresponding to the content description to be delivered next.

4. A non-transitory medium storing a audio-visual content output program to operate a computer, comprised in the audio-visual content output apparatus of claim 3 to perform the method of claim 3.

* * * * *